United States Patent
Peach et al.

(10) Patent No.: US 9,742,792 B2
(45) Date of Patent: Aug. 22, 2017

(54) SITE SECURITY MONITOR

(71) Applicant: WhiteHat Security, Inc., Santa Clara, CA (US)

(72) Inventors: John Philip Peach, Santa Clara, CA (US); Robert Hansen, Santa Clara, CA (US)

(73) Assignee: WhiteHat Security, Inc., Santa Clara, CA (US)

( * ) Notice: Subject to any disclaimer, the term of this patent is extended or adjusted under 35 U.S.C. 154(b) by 29 days.

(21) Appl. No.: 14/504,256

(22) Filed: Oct. 1, 2014

(65) Prior Publication Data

US 2016/0099962 A1    Apr. 7, 2016

(51) Int. Cl.
*H04L 29/06* (2006.01)
*G06F 21/57* (2013.01)

(52) U.S. Cl.
CPC ........ *H04L 63/1433* (2013.01); *G06F 21/577* (2013.01)

(58) Field of Classification Search
None
See application file for complete search history.

(56) References Cited

U.S. PATENT DOCUMENTS

| | | | | |
|---|---|---|---|---|
| 7,841,007 B2 * | 11/2010 | Currie | ................... | G06F 21/577 726/25 |
| 8,001,603 B1 * | 8/2011 | Kennedy | ............... | G06F 21/563 713/165 |
| 8,516,590 B1 * | 8/2013 | Ranadive | ............ | H04L 63/1483 713/187 |
| 8,555,391 B1 * | 10/2013 | Demir | ..................... | H04L 67/20 713/187 |
| 8,683,584 B1 * | 3/2014 | Daswani | ............... | G06F 21/577 726/22 |
| 8,850,570 B1 * | 9/2014 | Ramzan | .................... | G06F 1/00 709/223 |
| 8,966,582 B1 * | 2/2015 | Ainslie | ................... | G06F 21/51 726/2 |
| 9,077,745 B1 * | 7/2015 | Kline | ................. | H04L 63/1433 |
| 9,223,888 B2 * | 12/2015 | Hutchings | ........... | G06F 17/3089 |
| 9,298,824 B1 * | 3/2016 | Vinnik | ............. | G06F 17/30864 |
| 2002/0073337 A1 * | 6/2002 | Ioele | .................... | H04L 12/2602 726/23 |
| 2004/0054654 A1 * | 3/2004 | Nomiyama | ....... | G06F 17/30864 |
| 2007/0028301 A1 * | 2/2007 | Shull | ..................... | G06F 21/552 726/22 |

(Continued)

FOREIGN PATENT DOCUMENTS

KR  WO 2014098337 A1 *  6/2014  ............. G06F 21/51

OTHER PUBLICATIONS

Extended European Search Report in EP Patent Application No. 15186572.2, mailed Feb. 4, 2016, 6 pages.

*Primary Examiner* — Malcolm Cribbs
(74) *Attorney, Agent, or Firm* — Polsinelli PC

(57) ABSTRACT

Techniques for monitoring site security are disclosed herein. Sites are scanned for security metric values associated with one or more security metrics. Normalized values for those scanned security metric values are calculated based on previously obtained values associated with one or more other security metrics associated with other scanned sites. Site security metrics are then calculated for the sites based on a subset of the normalized values and based at least in part on a comparison to other scanned sites.

20 Claims, 8 Drawing Sheets

(56) References Cited

U.S. PATENT DOCUMENTS

| | | | |
|---|---|---|---|
| 2007/0226794 A1* | 9/2007 | Howcroft | G06F 21/57 726/22 |
| 2009/0172818 A1* | 7/2009 | Sutherland | G06F 21/577 726/25 |
| 2010/0121773 A1* | 5/2010 | Currier | G06F 21/577 705/347 |
| 2011/0126285 A1* | 5/2011 | Lee | G06F 21/53 726/22 |
| 2011/0282908 A1* | 11/2011 | Fly | G06F 21/577 707/783 |
| 2012/0017281 A1 | 1/2012 | Banerjee et al. | |
| 2012/0030757 A1* | 2/2012 | Baikalov | G06F 21/56 726/22 |
| 2012/0036580 A1* | 2/2012 | Gorny | H04L 43/0876 726/25 |
| 2012/0310937 A1* | 12/2012 | Stibel | G06F 17/30864 707/737 |
| 2013/0276112 A1* | 10/2013 | Dalcher | H04L 63/1425 726/23 |
| 2013/0318567 A1 | 11/2013 | Serrano et al. | |
| 2014/0033307 A1* | 1/2014 | Schmidtler | H04L 63/1483 726/22 |
| 2014/0189873 A1* | 7/2014 | Elder | G06F 21/577 726/25 |
| 2014/0259158 A1 | 9/2014 | Brown et al. | |
| 2015/0319184 A1* | 11/2015 | Lee | G06F 21/51 726/22 |

* cited by examiner

SITE SECURITY MONITOR

BACKGROUND

Modern computer systems may provide access to services using web-based interfaces. In such an access model, clients connect to servers over a network such as the Internet, through a web-based interface, which may allow access to services operating on the servers using Internet protocols or interfaces. Maintaining the security of such web-based interfaces and the security of the services that are supported by those interfaces may be difficult, particularly when client devices are not always trusted. Maintaining the security of such systems may be made more difficult when the scope and type of security vulnerabilities frequently change.

An operator of a website may wish to know how the website compares to other websites in terms of security and may wish to have assurances that the websites are more secure than those other websites. A related issue is that users of client devices may wish to be provided assurances about the security of the websites in order to protect the client device or the client data from potentially dangerous websites. Various security metrics may exist to indicate a level of security of a website, but such metrics may vary in precision, accuracy, and/or data compared. Without a metric of security that may be applied across a plurality of sites, a user of a website may not know how secure that website is, the operator of a website may not know how secure that website is in comparison to other websites, and other services may not have any assurances about how secure that website is.

BRIEF SUMMARY

A method for scanning and categorizing security factors associated with a host location of a web application is provided, wherein a web application is one or more programs that operate on a computer system and that are configured to interact with client applications. The client applications may access the web application over a network such as the Internet. The method described herein comprises scanning the host location for a plurality of security factors, combining those security factors to produce a series of security indices over time, and using those security indices to determine one or more inferences about the security of the host location in comparison to other host locations.

The following detailed description together with the accompanying drawings will provide a better understanding of the nature and advantages of the present invention.

BRIEF DESCRIPTION OF THE FIGURES

Various embodiments in accordance with the present disclosure will be described with reference to the drawings, in which.

DETAILED DESCRIPTION

Figure 1:
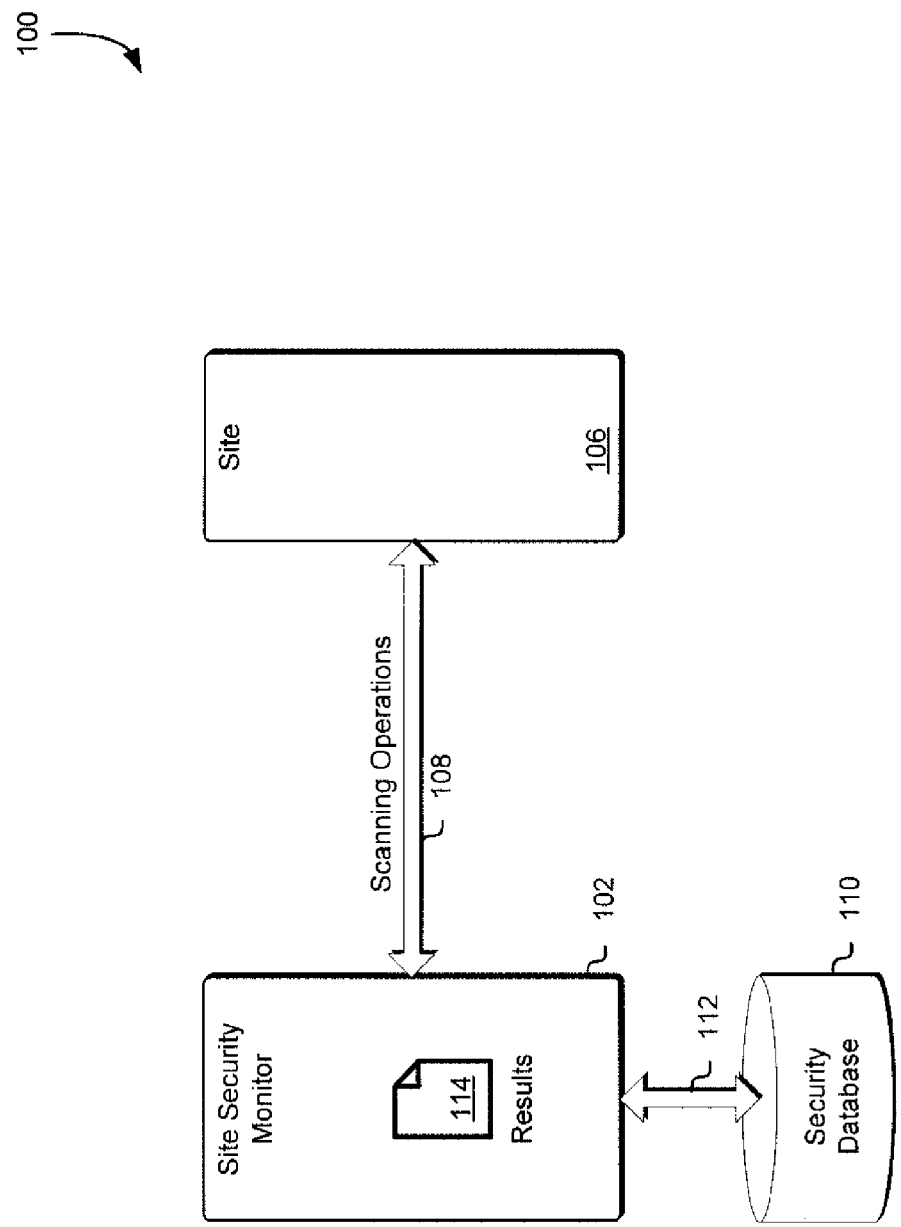
FIG. 1 illustrates an environment where a site security monitor may monitor a site in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details after reading this disclosure. Furthermore, well-known features may be omitted or simplified in order not to obscure the embodiment being described.

Techniques described and suggested herein include methods, systems and processes to analyze a level of security of sites hosting web services (also referred to herein as "websites" or, more simply, as "sites"), to compare the level of security of those sites to the level of security of other sites hosting websites, and use security data to infer the level of security (also referred to herein as a "site security index") of new sites. A site security monitor may be configured to perform site security analyses of a plurality of websites. These site security analyses may be used to more quickly and accurately identify security vulnerabilities associated with those websites, to help site operators focus remediation efforts on critical security vulnerabilities, and to quickly draw inferences about the level of security of websites based on the collected analyses. With a standard of trustworthiness, website security can be considerably improved.

A user of a website may wish to know the vulnerabilities of a website in order to determine the possible threat level of that website. One method of determining those vulnerabilities is to attempt to gain access to the website using a simulated attack. Such a simulated attack may cause a site with vulnerabilities to fail, become unresponsive, or become modified in unintended and/or dangerous ways, which may have drastic consequences. Such a simulated attack may also be expensive or computationally difficult and, with more complex sites, may require authentication and/or knowledge about the site structure in order to provide a full vulnerability analysis. The authentication may be based on one or more authentication attributes including, but not limited to, usernames, passwords, certificates, cryptographic keys, site profiles, security policies, or other such attributes. A site security monitor may be configured to perform such a vulnerability analysis while limiting potentially negative effects on the site to determine real and/or implied vulnerabilities without doing a destructive scan of the site. Site security monitors may be configured to perform authorized attacks (e.g., by attempting potentially damaging actions) and may also be configured to perform scans on sites to note potential vulnerabilities for later analysis. For example, an authorized attack may attempt a denial of service attack and may gather data about the site based on the response to that attack. Such an authorized attack is a type of scan, which may be configured to identify vulnerabilities in a site. A site security monitor may also be configured to, for example, detect data stored in a public location that may appear to be usernames and passwords. Such detections (also referred to herein as a "crawls" of a site) are configured to identify portions of a site where vulnerabilities may exist. Crawls of a site may also be configured to, for example, detect insecure forms submission actions, or to detect improperly protected site cookies, or to detect other such potential security vulnerabilities.

A level of security metric (also referred to herein as a trustworthiness metric or a trustworthiness index) may be established using a site security monitor for a site (which may include a site, a domain, a host, a portion of such entities, a plurality of such entities, or a combination of these and/or other entities). In an embodiment where the trustworthiness metric is established for a portion of a site, the portion may be defined by, for example, specific login credentials associated with the site, a directory on the site, a set of directories on the site, language sets, the time of day, or some other such factors. The site security monitor may measure how safe that site is in terms of security vulnerabilities associated with the site. The site security monitor may also determine the likelihood that a vulnerability would get promptly fixed, once that vulnerability has been discovered.

As used herein, a site security monitor is a computer system that is configured to monitor the security of sites (e.g., websites) by scanning those sites and to perform one or more operations to analyze security vulnerabilities associated with those sites. A site security monitor may be a physical computer system with executable code operating thereon, or may be a virtual computer system with executable code operating thereon, or may be a collection of such physical and/or virtual computer systems operating collectively. For example, the site security monitor may operate as a collection of virtual machines on a network such as the Internet and using computer resources provided by a computing resources service provider. In another example, a site security monitor may be configured to operate on a server, wherein the server is a physical computer system that is connected to a network such as the Internet and that is configured to use that network connection to scan other sites on the network. The metric may be established by first establishing one or more criteria such as, the length of time that the site has had scans performed by the site security monitor (i.e., how long the site security monitor has been in service and scanning the site), how frequently the site is scanned by the site security monitor, whether various compliance metrics associated with the site have been met, how complex the site is, or other such criteria.

A site security monitor may then be configured to measure parameters and their values associated with the one or more criteria, and may also be configured to examine both current and past parameters and their values in order to establish a history of those parameters. In an embodiment, the lack of an expected parameter and/or an expected parameter value may also be measured (or noted) by the site security monitor. For the purposes of illustration, the criteria and/or the parameters may be collectively referred to herein as "factors" or as "security factors." A site security monitor may also be configure to measure, for example, a change in value of that parameter from one value (e.g., a value that represents the lack of a vulnerability) to another value (e.g., a value that represents the presence of a vulnerability). From the parameter history, a probability distribution may be determined for one or more of the parameters and, from that probability distribution, a distribution function (also referred to herein as a cumulative distribution function) may be determined. The distribution function may then be used to model, based on the parameter history, the probability that a parameter will have a certain value at a point in the future, the length of time that a parameter is likely to remain in a changed state, the length of time between parameter changes, or other parameter relationships.

For example, one factor associated with a metric may be whether a site is compliant with the Payment Card Industry Data Security Standard ("PCI DSS" or simply "PCI") for processing, storing, or transmitting cardholder data. Compliance with PCI DSS may require, for example, that a site conforms to validation types, performs validations, maintains security standards, performs timely software updates, submits to periodic scans, or other such requirements. A system may be configured to measure one or more parameters with these PCI DSS requirements to determine whether the site is compliant. A system may also be configured to allow a third-party system to determine compliance. In an embodiment, the PCI DSS compliance parameter is a binary value with a value of one (or true) if the system is compliant when the parameter is measured and a value of zero (or false) if the system is not compliant when the parameter is measured. Based on a plurality of measurements of this parameter, a distribution function may be determined that may model the probability that the site may, for example, be compliant with PCI DSS at some determined point in the future (i.e., the probability that the vulnerability will be fixed by a certain date). Such a probability may be used as a weighting factor in determining the trustworthiness of the site. Such a probability may also be used to correct for calculations based on different service levels as described herein.

The one or more factors may then be combined to produce the trustworthiness metric for a site by, for example, weighting one or more of the factors and combining the factors to produce an indexed value to indicate the trustworthiness of the site. The weighting of the one or more factors may be done with a weighted arithmetic mean, which is a weighted average of a series of values, where some of the values contributed more to the weighted average than others. For example, a series of values comprising {1, 2, 3, 4, and 5} has an average of three (fifteen divided by five). However, if the last value (5) is weighted as twice as important as the other four values, then the weighted arithmetic mean of the series of values would be four (twenty divided by five). The weights associated with the weighted arithmetic mean may be based on one or more security objectives. For example, a security objective may be to ensure compliance with PCI DSS. Such a security objective may mean that the factor associated with such compliance has a higher weight than, for example, a factor associated with the complexity of the site.

The trustworthiness index for a site may be used to show the trustworthiness of the site over time and may also be used to compare the trustworthiness of the site to other sites. The comparison to other sites may also be used to compute the trustworthiness index. For example, the probability distribution function of a parameter for a site may be used to evaluate a site in comparison to other sites. The probability density function may also be normalized in comparison to other probability density functions of other sites.

As an example, a software release may break PCI DSS compliance for all sites of a certain class. In such an example, all sites of that certain class may have a security vulnerability due to the software release and one or more of the sites may have their trustworthiness index lowered as a result of that vulnerability. For example, a site that takes 30 days to address the vulnerability while other sites in the same class take ten days to address the vulnerability may have its trustworthiness index lowered by a larger amount than the other sites due to the comparatively longer delay in addressing the vulnerability in relation to other sites. Other weightings of the factors may be introduced to, for example, encourage focus on the rapid repair of vulnerabilities, encourage focus on compliance with one or more required compliance initiatives, encourage focus on more severe vulnerabilities, encourage focus on timely software updates, or encourage focus on other behaviors. As may be contemplated, the types of criteria, the parameters associated with those criteria and the methods of combining those criteria (or factors) to produce a trustworthiness index described herein are merely illustrative examples; and other such types of criteria, parameters associated with those criteria and methods of combining those factors to produce a trustworthiness index may be considered as being within the scope of the present disclosure.

FIG. 1 illustrates an environment 100 where a site security monitor may monitor a site. A site security monitor 102 may perform one or more scanning operations 108 on a site 106. The site 106 (e.g., a website) may be one of a plurality of sites provided by a site operator (i.e., the owner and/or operator of the site) that may be part of one or more domains. An operator may be a trusted operator such as a customer (i.e., a client or user of the site security monitor), may be an untrusted operator such as a non-customer, or may be unknown. A site may be a domain with a plurality of hosts (for example, "example.com"), or a subdomain with a plurality of hosts (for example, "subdomain.example.com"), or a single host (for example, "host.example.com"), or a service running on a host (for example, "host.example.com:service"), or may be some other site type. The site security monitor 102 may perform the one or more scanning operations 108 on the site 106 for one or more parameters and/or one or more factors associated with a trustworthiness index as described herein.

Each of the factors may be weighted based on a weighting factor and each of the factors may be determined at least in part by comparing them to the factors of other sites so that, for example, a site that addresses security vulnerabilities quickly in comparison to other sites may have higher values for factors while a site that addresses security vulnerabilities slowly in comparison to other sites may have lower values for factors. The comparison to other sites may be accomplished by, for example, normalizing the factor values from the scan in comparison to factor values from other scans. For example, feature scaling may be used to normalize a value with respect to a set of other values over a normalized range of values (typically a range from zero to one). Feature scaling of a value with respect to a set of values is done by subtracting the minimum value of the set of values from the value and then dividing that result by the difference between the maximum value of the set of values and the minimum value of the set of values. For example, feature scaling the value three with respect to the set of values comprising {1, 2, 3, 4, and 5} yields a normalized value of 0.5 (i.e., three minus one divided by five minus one).

The factors may be analyzed and/or combined by the site security monitor 102 to produce one or more results 114 which may be stored 112 in a security database 110 (also referred to herein as a "data store") as described herein. As used herein, a security database 110 may be a database, a data store, a flat file, a hierarchical file system, a document storage system, or some other data storage schema. The results 114 may include a trustworthiness index for the site 106 and may also include one or more derived results based on data obtained from other sites and/or stored in the security database 110.

The factors may be determined based at least in part on one or more time values that may be measured in, for example, days (including partial days). For example, a vulnerability that begins at noon on January first and that ends at six in the evening on January fifth may exist for five days (four days and six hours). In this example, the first time value associated with this parameter is the onset time, which is noon on January first (and is the timestamp associated with a first parameter) and the second timestamp associated with this parameter is the time of the end of the vulnerability, which is five days. Other time values may be associated with parameters, parameter values, or other criteria including, but not limited to, times of observations, offset times (from one or more of the other time events), time windows and/or other such time values. Time values may be absolute or relative to other time values. Relative time values may be positive (i.e., in the future) or negative (i.e., in the past).

Factors may be determined based at least in part on one or more distribution functions as described herein. Observed parameter changes may be used to determine these distribution functions. A probability density function may define the probability that an event will occur exactly at a particular discrete time. For example, if observed parameter changes indicate that it is 20 percent likely that a vulnerability would close on the fourth day after it opened for a certain site, the probability density function evaluated at the value four would be 0.2. The values of a probability density function will generally sum to one so, in this example, a probability density function may indicate that, on each of the first four days, it is 20 percent likely that the vulnerability will close, on the fifth day it is ten percent likely, and sixth day, it is also ten percent likely.

Further distribution functions may be based on this probability density function. For example, a probability that an event will occur before a certain time (i.e., a cumulative distribution function) may be defined as the sum of the probability density function values for times less than that certain time. The cumulative distribution function value for the fifth day in the above example is 80 percent (or 0.8). The probability that an event will not occur before a certain (i.e., a survivorship function) may be defined as the sum of the probability density function values for times greater than or equal to that certain time. The survivorship function value for the fifth day in the above example is 20 percent (or 0.2) based on the ten percent likelihood associated with each of the fifth and sixth days. A survivorship function value for a certain time may be an indicator for the probability that a vulnerability may exist (i.e., may survive) after that time. Survivorship functions may have censored measurements (i.e., a condition wherein the value of the measurement is unknown or partially known) so that, for example, the survivorship function value for a certain day may be "at least 20 percent" or some other such censored value. As may be contemplated, the distribution functions described herein are illustrative examples and other such distribution functions may be considered as being within the scope of the present disclosure.

Figure 2:
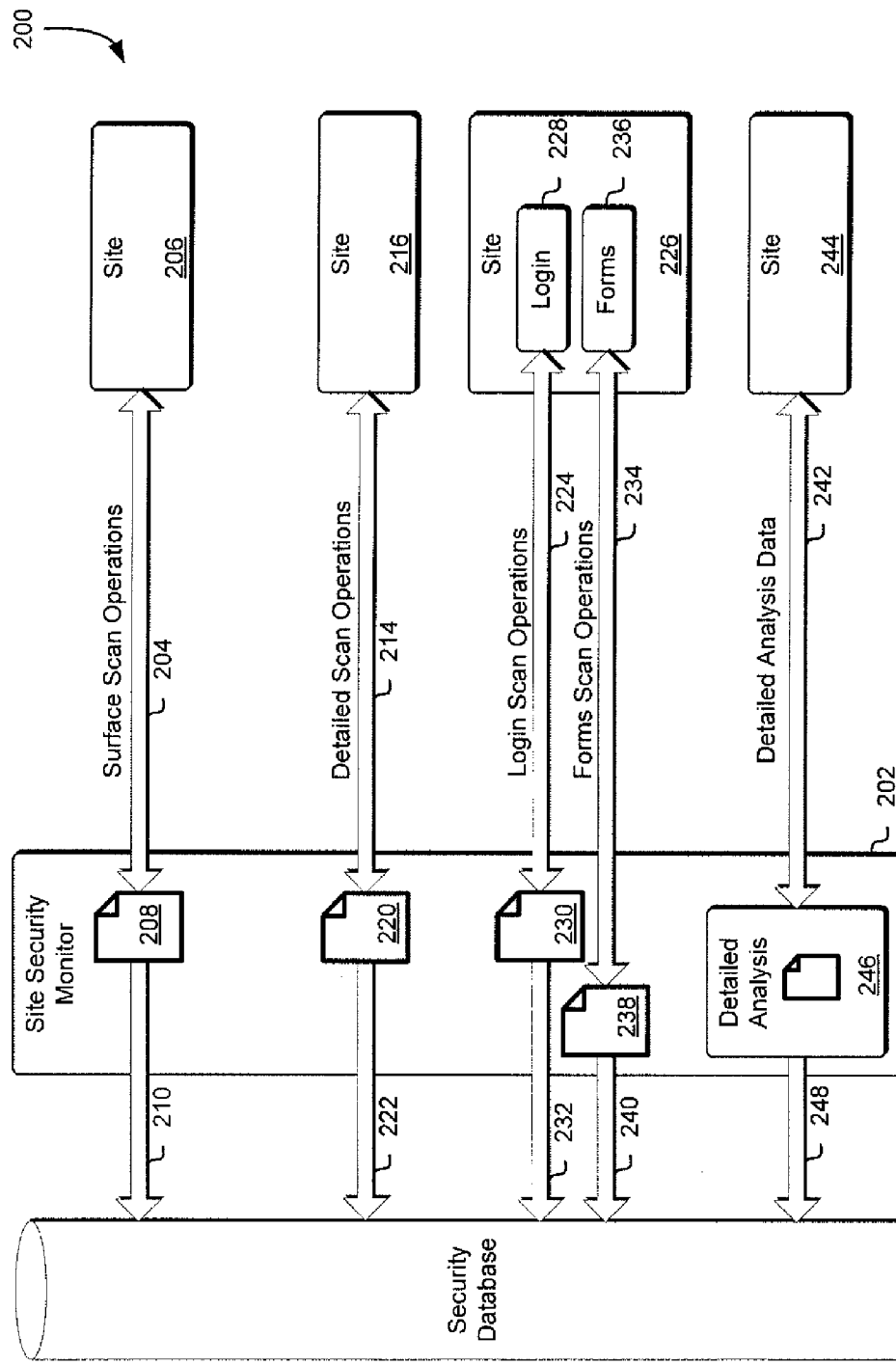
FIG. 2 illustrates an environment where a site security monitor may perform security scans in accordance with an embodiment.

FIG. 2 illustrates an environment 200 where a site security monitor may perform security scans as described herein in connection with FIG. 1. The different security scans may have a level of detail based at least in part on the site being scanned and/or based at least in part on a level of service (also referred to herein as a "service level") associated with the site being scanned. For example, a site operator may operate a site with a low service level, which may indicate that the site may only be scanned with a surface scan or with simple and/or inexpensive scans. A site operator may also operate a site with a medium service level, which may indicate that the site may be scanned with more detailed scans. A site operator may operate a site with a high service level, which may indicate that the site may be scanned with a still more detailed scans. Examples of such scans include login scans (i.e., a scans that are authenticated to the site) and forms scans (i.e., a scan that attempts to use and/or misuse forms associated with the site). For example, a medium service level may indicate the performance of login scans and forms scans and all sites with a medium service level may have such scans performed while a high service level may indicate the performance of login scans and forms scans, plus the performance of manual scans, simulated attacks, or other such additional data gathering techniques. Different service levels may correspond to different scan configurations so, for example, the highest service level may include regular surface scans, regular detailed scans, regular login scans, regular forms scans, and regular detailed scan analysis.

In the first example illustrated in FIG. 2, a site security monitor 202 may perform one or more surface scan operations 204 on a site 206. The surface scan operations 204 (also referred to herein as unauthenticated scans or scans that perform no form submissions) may be configured to only access publicly available interfaces and/or obtain publicly available information associated with the site 206. The surface scan operations may be configured to use information that is available without an agreement with the site operator, without login credentials, without knowledge of the forms associated with the site, or without other such privileged information (i.e., similar to the level of penetration of a website that might be performed by, for example, a web crawler application). The surface scan operations may also be configured to gather information about a site and/or to correlate relations between sites. A surface scan may also be configured to look for vulnerabilities. Publicly available interfaces (e.g., web-based application programming interfaces) may allow the surface scan to query the site 206 for information. The publicly available information associated with a site 206 may be obtained from the site 206 or may also be obtained from a third party. For example, various web search engines collect data associated with a site that may be made available to a query to those web search engines.

Surface scan operations 204 might not be configured to access privileged information associated with the site 206 including, for example, forms on the site 206, the version of the operating system of the site 206, or other such privileged information. The surface scan operations 204 may be configured to record instances where information that should not be publicly available from the site 206 is publicly available to the surface scan. The result 208 of the surface scan operations 204 may be stored 210 in a security database 212 in a scan record associated with an identifier of the site 206 and also associated with the time of the one or more surface scan operations 204.

In the second example illustrated in FIG. 2, a site security monitor 202 may perform one or more detailed scan operations 214 of a site 216 which may be operated by a site operator as described herein. The detailed scan operations 214 may be configured to obtain information similar to the information obtained from a scan such as the surface scan operations 204 and may also be configured to obtain additional information about the site 216. The detailed scan operations 214 of a site 216 may be configured to obtain this additional information because the site security monitor 202 may be provided with credentials and/or application programming interface ("API") access by the site operator. A site security monitor 202 may be provided with credentials by the site operator to make an API call to the site 216 to obtain this additional information. For example, a site operator may have information regarding PCI DSS compliance for the site 216 and may be configured to provide that information to the site security monitor 202 in response to the detailed scan operations 214. The result 220 of the detailed scan operations 214 may also be stored 222 in the security database 212 in a scan record associated with an identifier of the site 216 and/or with the time of the detailed scan operations 214.

The other examples illustrated in FIG. 2 show more detailed scans that that may be initiated by a site security monitor 202 based upon a level of service associated with a site operator and/or one or more sites. A site security monitor 202 may perform one or more login scan operations 224 that may be based on credentials for the site 226 provided by a site operator. For example, the login scan operations 224 may be configured with functionality to allow the site security monitor 202 to execute operations to login 228 to the site 226 and to perform one or more privileged operations to gather additional security information associated with the site 226. The result of the login scan operations 224 may then be stored 232 in the security database 212 as described herein.

The site operator may also provide form layout information for forms 236 associated with the site 226 to allow the site security monitor 202 to perform one or more forms scan operations 234 associated with the site 226. Forms scan operations 234 may be configured to access the forms associated with the site 226, to use the form layout information to programmatically fill in the forms, and to use the results of the filling in those forms to gather additionally detailed security information. Forms scan operations 234 may also include automatic forms training wherein the site security monitor determines form layout information. Forms scan operations 234 may also include manual forms training wherein an operator of the site security monitor determines form layout information. The results 238 of the forms scan operations 234 may be stored 240 in the security database 212 as described herein.

In an embodiment, the site security monitor has credentials from the site operator to access highly privileged data to perform detailed analysis data 242 from the site 244. In such an embodiment, this detailed analysis data 242 is used by the site security monitor 202 to perform a detailed analysis 246 of the security of the site 244 that may provide the most detailed security information associated with the site. The results of this detailed analysis may be stored 248 in the security database 212 as described herein.

Figure 3:
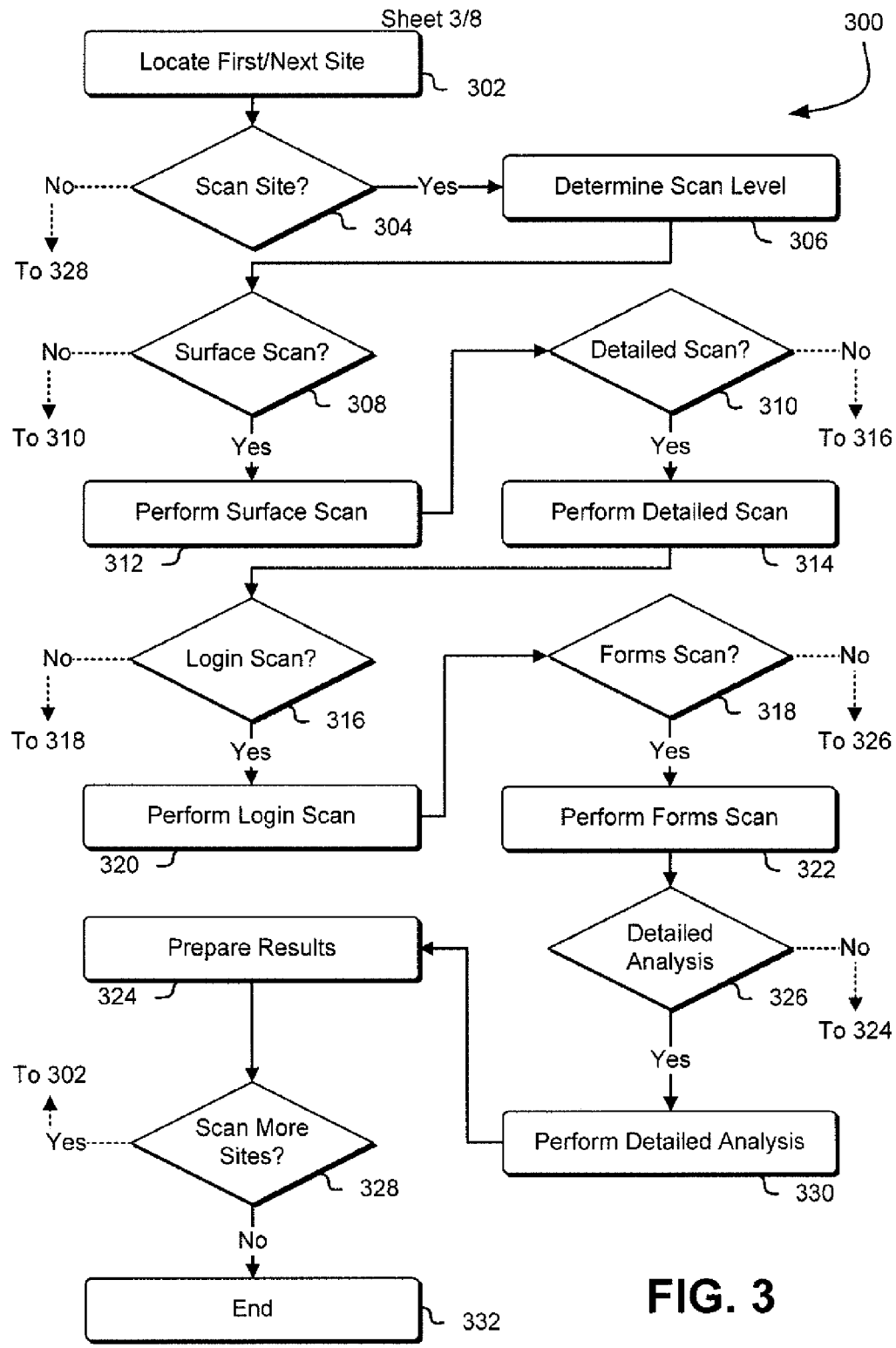
FIG. 3 illustrates a process for performing security scans in accordance with an embodiment.

FIG. 3 illustrates a process 300 for performing security scans as described herein in connection with FIG. 1. A site security monitor such as the site security monitor 102 illustrated in connection with FIG. 1 may perform the process illustrated in FIG. 3. The site security monitor may locate the first site 302. The first site may be one or more of a plurality of possible sites or one or more of a plurality of portions of possible sites. The site security monitor may first determine whether to scan the site 304 based on, for example, the operator of the site. If the site security monitor determines to scan the site 304, the site security monitor may determine the scan level 306 of the site. For example, the site security monitor may determine the scan level based on parameters associated with the site and/or based on a level of service requested by the scan operator. A site with a higher scan level may have more scans and/or more detailed scans performed on the site. If the site security monitor determines not to scan the site 304, the site security monitor may then determine whether to locate the next site of the sites 328 and proceed as described herein below.

Based at least in part on the scan level, the site security monitor may first determine whether to perform a surface scan 308. A surface scan 308 may be a scan that accesses only publicly available information about the site. A surface scan 308 may be performed in addition to other scans. Those other scans may also be performed in place of a surface scan 308. If the site security monitor determines to perform a surface scan 308, the site security surface may perform the surface scan 312 by executing one or more surface scan operations as described herein in connection with FIG. 2. For example, the site security monitor may perform the surface scan 312 by querying one or more publicly available websites to request information about the sites such as software versions, page ranks, registration information, copyright notices, or other such publicly available information. Executing the one or more operations to perform the surface scan 312 may result in scan results associated with the site.

The site security monitor may next determine whether to perform a detailed scan 310. This determination may be made based at least in part on the level of service associated with a site. A detailed scan 310, which may be performed with the site security monitor, has access to more privileged information about the site (i.e., more than publicly available information) such as when that information may be provided to the site security monitor by the site operator. If the site security monitor determines to perform a detailed scan 310, the site security monitor may perform the detailed scan 314 by executing one or more detailed scan operations as described herein in connection with FIG. 2. For example, the site security monitor may perform the detailed scan 314 by using web interfaces and/or APIs to query the site, using some authentication credentials provided by the site operator. Executing the one or more operations to perform the detailed scan 314 may result in scan results associated with the site.

The site security monitor may next determine whether to perform a login scan 316. This determination may be made based at least in part on the level of service associated with a site. A login scan 316 is an example of a detailed scan in which an operator provides the site security monitor with authentication credentials, and the site security monitor uses those credentials to log into the site and to analyze the security of the privileged portions of the site. If the site security monitor determines to perform a login scan 316, the site security monitor may perform the login scan 320 by executing one or more login scan operations as described herein in connection with FIG. 2. For example, the site security monitor may perform the login scan 320 by logging into the site using the authentication credentials and then may perform one or more operations to ensure that the site does not have internal vulnerabilities. Executing the one or more operations to perform the login scan 320 may result in scan results associated with the site.

The site security monitor may next determine whether to perform a forms scan 318. This determination may be made based at least in part on the level of service associated with a site. A forms scan 318 is also a detailed scan in which an operator provides details about the forms associated with the site to the site security monitor that may then be used to determine whether those forms exhibit any vulnerabilities associated with those forms. A forms scan 318 may require logging into the site and so may be performed in connection with a login scan such as the login scan 316. If the site security monitor determines to perform a forms scan 318, the site security monitor may perform the forms scan 322 by executing one or more forms scan operations as described herein in connection with FIG. 2. For example, the site security monitor may perform the forms scan 322 by using the provided forms information to fill out and submit the one or more forms associated with the site and to determine the results of submitting those forms. The site security monitor may further analyze the site by providing incorrect and/or improper information when submitting forms to analyze the fault tolerance of those forms. Executing the one or more operations to perform the forms scan 322 may result in scan results associated with the site.

The site security monitor may next determine whether to perform a detailed analysis 326. This determination may be made based at least in part on the level of service associated with a site. A detailed analysis (also referred to herein as a manual analysis) may use the data from one or more other scans to perform a more in-depth scan of the site and to produce a more detailed or more thorough analysis of the site and any associated vulnerabilities. If the site security monitor determines to perform a detailed analysis 326, the site security monitor may perform the detailed analysis 330 as described herein in connection with FIG. 2. For example, the site security monitor may perform the detailed analysis 330 by comparing results of multiple scans to results obtained from a subclass of other similar sites that have been scanned. Executing the one or more operations to perform the detailed analysis 330 may result in additional scan results associated with the site, which may be based on the surface scan results, the detailed scan results, the login scan results, the forms scan results, or other scan results.

The site security monitor may next collect the results from the scans (i.e., the surface scan results, the detailed scan results, the login scan results, the forms scan results, or other scan results) and may prepare these results 324 by, for example, combining the results and/or associating the results with an identifier associated with the site. The scan data from a plurality of sites may be gathered prior to performing any calculations of the trustworthiness of one or more sites. In an embodiment, the data from a surface scan may be used in conjunction with other scan data to infer a level of security of the site that would be calculated if more detailed scans were performed. This surface scan data calculation may be based on similarities in the surface scan results of other sites that also had detailed scans performed. The scan data may also be gathered from a plurality of scans performed at a time interval (e.g., hourly, daily, or weekly) and over a time span (e.g., for a week, a month, a year, or perpetually). Different security scans performed at different times (also referred to herein as over a "non-zero time span") may provide more detailed information about the site being scanned due to changes in vulnerabilities of the site. The site security monitor may then determine whether to scan more sites 328 and, if so, may continue the process 300 by selecting the next site. If the site security monitor determines to not scan more sites 328, the process 300 may end 332.

Figure 4:
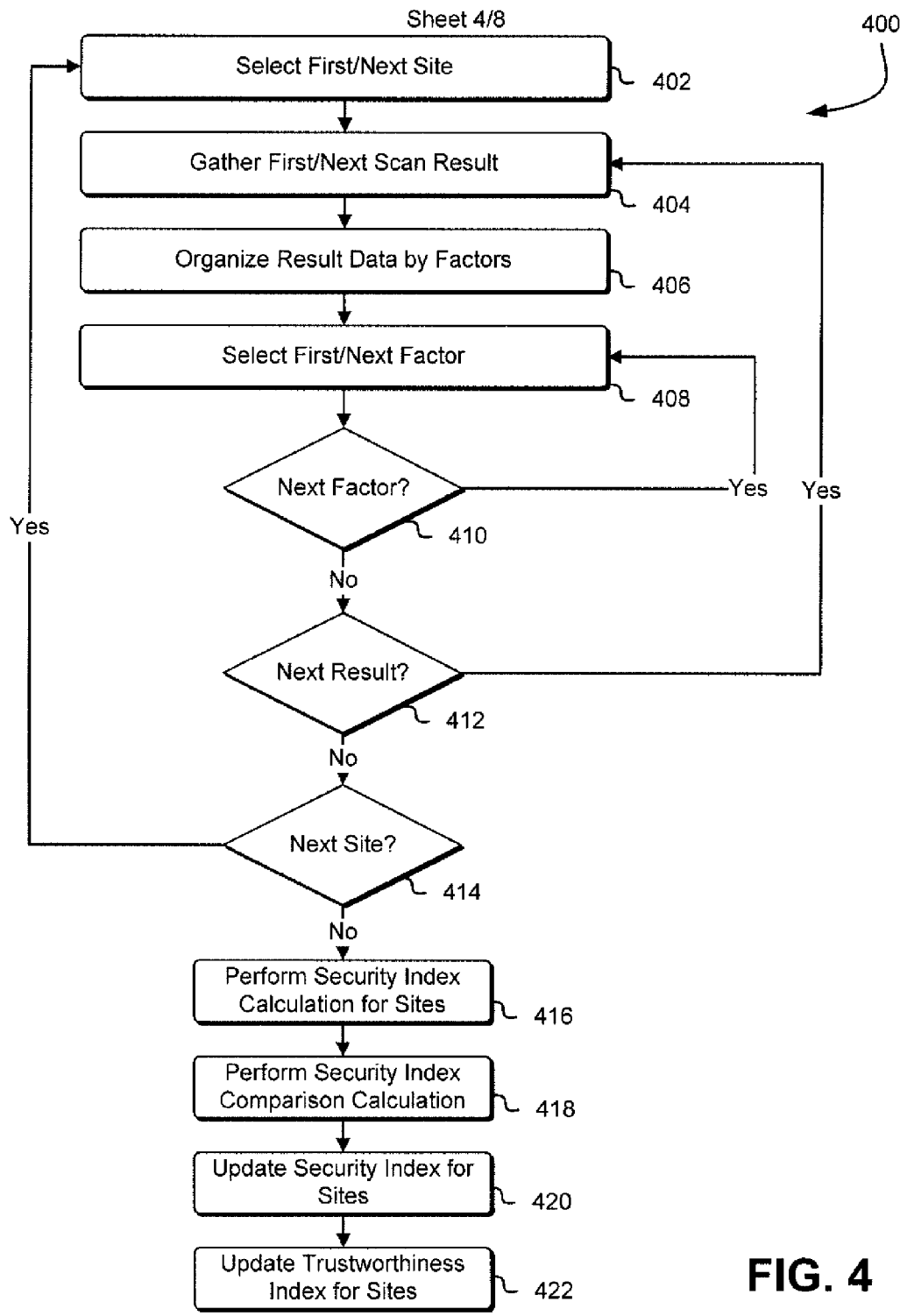
FIG. 4 illustrates a process for combining security factors from security scans to update a trustworthiness index in accordance with an embodiment.

FIG. 4 illustrates a process 400 for combining factors from security scans to update a trustworthiness index as described herein in connection with FIG. 1. A site security monitor such as the site security monitor 102 illustrated in connection with FIG. 1 may perform the process illustrated in FIG. 4. The site security monitor may first select a site 402 and may gather scan results 404 for that site as described in connection with FIG. 3. The site security monitor may then organize the scan results by one or more factors 406 such as, for example, duration of service, missing authentication, compliance, or other factors.

The site security monitor may then select each factor 408 and may continue gathering factors and results for sites while there are remaining factors 410, remaining results 412, and remaining sites 414 to examine. Once the data from the factors, scans, and sites have been gathered, the site security monitor may then perform security index calculations 416 associated with the factors and results, and based on the scan results, to produce a security index calculation for the sites. For example, the site security monitor may be analyzing the scan results for a compliance factor and may apply a weighting to the security index based on the importance of that compliance factor in comparison to other factors (i.e., by applying a higher weighting to more important factors and a lower weighting to less important factors). The site security monitor may then perform a security index comparison calculation 418 for the sites by, for example, adjusting the security index based on historical results for the site for that compliance factor and/or based on comparison to the results for one or more other sites for that compliance factor. The site security monitor may then update the security index for the site 420 (i.e., update a value for the factor based on an identifier associated with the site) and may also update the trustworthiness index for the 422 (i.e., update a single combined index based on an identifier associated with the site).

As may be contemplated, the order of the operations in the process 400 illustrated in FIG. 4 is merely for illustrative purposes and other orders of operations may be considered as being within the scope of the present disclosure. In the illustrated embodiment, factor data for a collection of sites may be gathered periodically (i.e., every day) and a trustworthiness index may be calculated based on relative factors across all sites for that day and after all data for all sites has been gathered. In another embodiment, the site security monitor may update the security index for the site 420 after the site security monitor determines whether to select the next factor of the factors 410 and before beginning the calculations for the next factor. The site security monitor may also update the trustworthiness index for the site 422 after the site security monitor determines whether to select the next factor of the factors 410. In an embodiment, the site security monitor perform trustworthiness index calculations for the site 422 a plurality of times during the process 400 such as, for example, after each factor is analyzed, after each scan result is analyzed, after each site is analyzed, or once per day based on the factors analyzed for other sites during that day as described herein.

Figure 5:
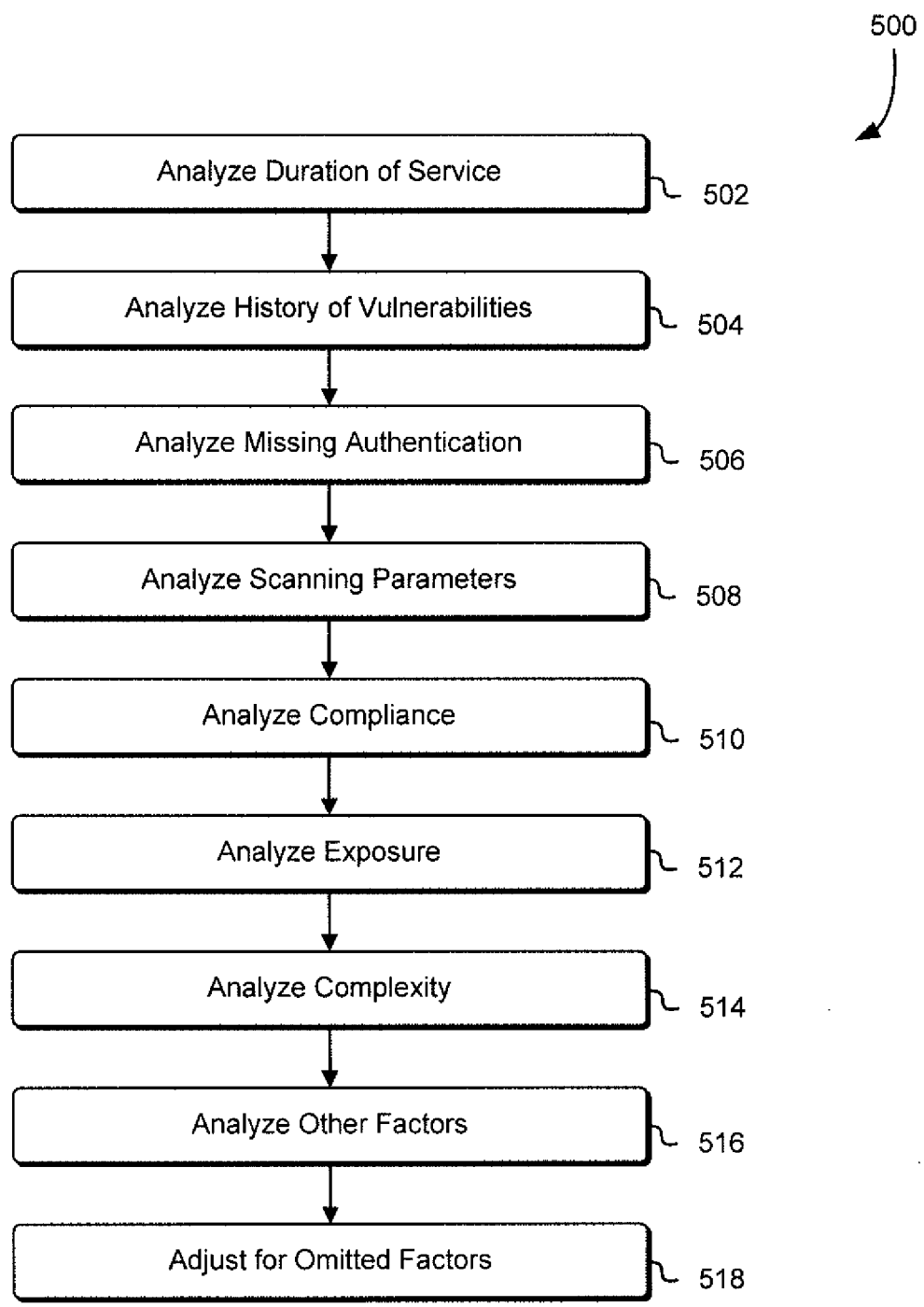
FIG. 5 illustrates a process for analyzing security factors from security scan results in accordance with an embodiment.

FIG. 5 illustrates a process 500 for analyzing factors from security scan results as described herein in connection with FIG. 1. A site security monitor such as the site security monitor 102 illustrated in connection with FIG. 1 may perform the process illustrated in FIG. 5. The site security monitor may first analyze the duration of service 502 for the site based at least in part on security scan results. The duration of service of a site may be based on the length of time that the site has been regularly scanned. The duration of service factor may be based on the principle that, the longer a site has been in service (i.e., the length of time that the site has been scanned as opposed to the length of time that the site had been physically operating) and regularly scanned, the more is known about the site and the more trustworthy the site may be. Conversely, a new and/or unfamiliar site may be less trustworthy.

The site security monitor may next analyze the history of vulnerabilities 504 for the site based at least in part on security scan results. A history of vulnerabilities value may be calculated by starting from an initially determined vulnerability value based, for example, on one or more parameters associated with the site, and decreasing that vulnerability value based on current vulnerabilities or increasing that base vulnerability value based on closing those vulnerabilities. The changes to the base vulnerability may be based on the severity of the vulnerability and/or on how promptly the vulnerability is closed. For example, a low severity vulnerability may have a small impact on base vulnerability while a high severity vulnerability may have a large impact. A vulnerability that remains open for a long time (even a low severity vulnerability) may have a constantly increasing impact on the base vulnerability. The history of vulnerabilities factor for a site may apply one or more weightings to the calculations to, for example, reward (e.g., increase the trustworthiness index) the fixing of security vulnerabilities promptly. The site security monitor may also reward promptly addressing the regression of vulnerabilities. For example, a vulnerability may be fixed at one point, but a rebuild and/or reinstallation of an environment or a rollback to prior functionality associated with an environment may cause the vulnerability to reappear. Promptly addressing this regression may be rewarded by the site security monitor.

Additionally, because a vulnerability may open and close quickly in rapid succession, the site security monitor may ignore such vulnerabilities to prevent the rapid changing in their status from impacting the integrity of the trustworthiness index. In calculating the trustworthiness index, different vulnerabilities may be given different weighting factors (i.e., assigned a different relative importance) based at least in part on a severity and/or a threat level. Those weights may then be normalized with respect to the proportion of other vulnerabilities of that severity and/or threat level that may have been observed in one or more other sites.

The site security monitor may next analyze for the presence of missing authentication credentials and/or functionality 506 for the site based at least in part on security scan results. Not all sites require authentication (i.e., logging in by providing proper credentials). For example, those sites that require authentication, but that have missing and/or improperly configured authentication, may be less trustworthy. Similarly, sites that do not have any authentication at all may be considered more trustworthy due to those sites being less of a target for malicious attackers and/or because there is no hidden data on those sites. A site with all data exposed may also be considered less secure when some or all of that data should be hidden. In an example of a site that does not protect data, but that should protect that data using some form of authentication, a site that does require authentication in order to access the site, but that allows a user to bypass the authentication by directly entering a uniform resource locator ("URL") of another page on the site, may have a decreased score (and thus, a decreased trustworthiness index) due to the missing authentication factor.

The site security monitor may next analyze scanning parameters 508 for the site based at least in part on security scan results. Examples of scanning parameters may include, but may not be limited to, the frequency of the scan, the detail of the scan, the amount of resources provided to perform the scan, or whether the scan ran to completion. For example, a site that completes all regularly scheduled scans on time may have a higher resulting trustworthiness index than a site that frequently cancels or disables scans.

The site security monitor may next analyze compliance 510 for the site based at least in part on security scan results as described herein. The site security monitor may analyze compliance (i.e., the PCI compliance analysis described herein) by analyzing a single parameter associated with compliance. The site security monitor may also analyze compliance by analyzing a plurality of parameters associated with compliance. A site with better compliance may have a higher trustworthiness index than a site with lower compliance. In an embodiment, the site security monitor will determine a plurality of compliance values associated with different compliance types and produce a single weighted compliance value for that site, based on the plurality of compliance values.

The site security monitor may next analyze exposure 512 for the site based at least in part on security scan results. The exposure of a site (also referred to as a window of exposure of the site) may be a measure of how exposed the site was to a vulnerability over a time period (the window). For example a site that closes a vulnerability quickly may have a higher trustworthiness index than a site that does not close a vulnerability quickly. Comparison to other sites may be of particular importance when analyzing exposure and the site security monitor may weigh the comparison to other sites accordingly.

The site security monitor may next analyze the complexity 514 of the site based at least in part on security scan results. A site that is more complex may be more vulnerable to malicious attacks and/or other vulnerabilities than a site that is less complex because the site that is more complex may require more maintenance, may have more possible avenues for a malicious attack and/or may be more likely to have security vulnerabilities due to the site complexity. Parameters for analyzing the complexity of a site may include, but may not be limited to, the number of forms available on a site, the absence of forms associated with a site, the number of pages available on a site, the number of requests that a site may process, the number of data paths that a site uses to store and/or retrieve information, or the number of services present on a site. A site with higher complexity may have a lower trustworthiness index than a site with lower complexity. A highly complex site may be analyzed in more detail by performing one or more sub-analyses of the site based on, for example, different services in order to produce a more fine-grained trustworthiness index for the site.

The site security monitor may next analyze other factors 516 associated with site based at least in part on security scan results including, but not limited to, customer selected factors, experimental factors, temporary factors, quality assurance factors, building factors, test factors, administrative factors, cloaking factors (i.e., showing different visitors different sets of content), or other factors. The site security monitor may next adjust for any omitted factors 518. Omitted factors may exist when a site operator disables one or more of the other scan result analyses. In order to maintain the integrity of the trustworthiness index (and hence, the viability of the trustworthiness index as a metric for comparison between sites), the site security monitor may need to adjust the trustworthiness index in one or more ways. For example, the analysis may assume a worst-case scenario for the missing factors, or may assume a best-case scenario for the missing factors, or may use an average value based on past performance for the site, or may use an average value based on past performance for all sites, or may use a combination of these and/or other heuristics. Finally, the site security monitor may combine results of the analyses of the factors using one or more weighing values as described herein to produce a trustworthiness index associated with the site.

Figure 6:
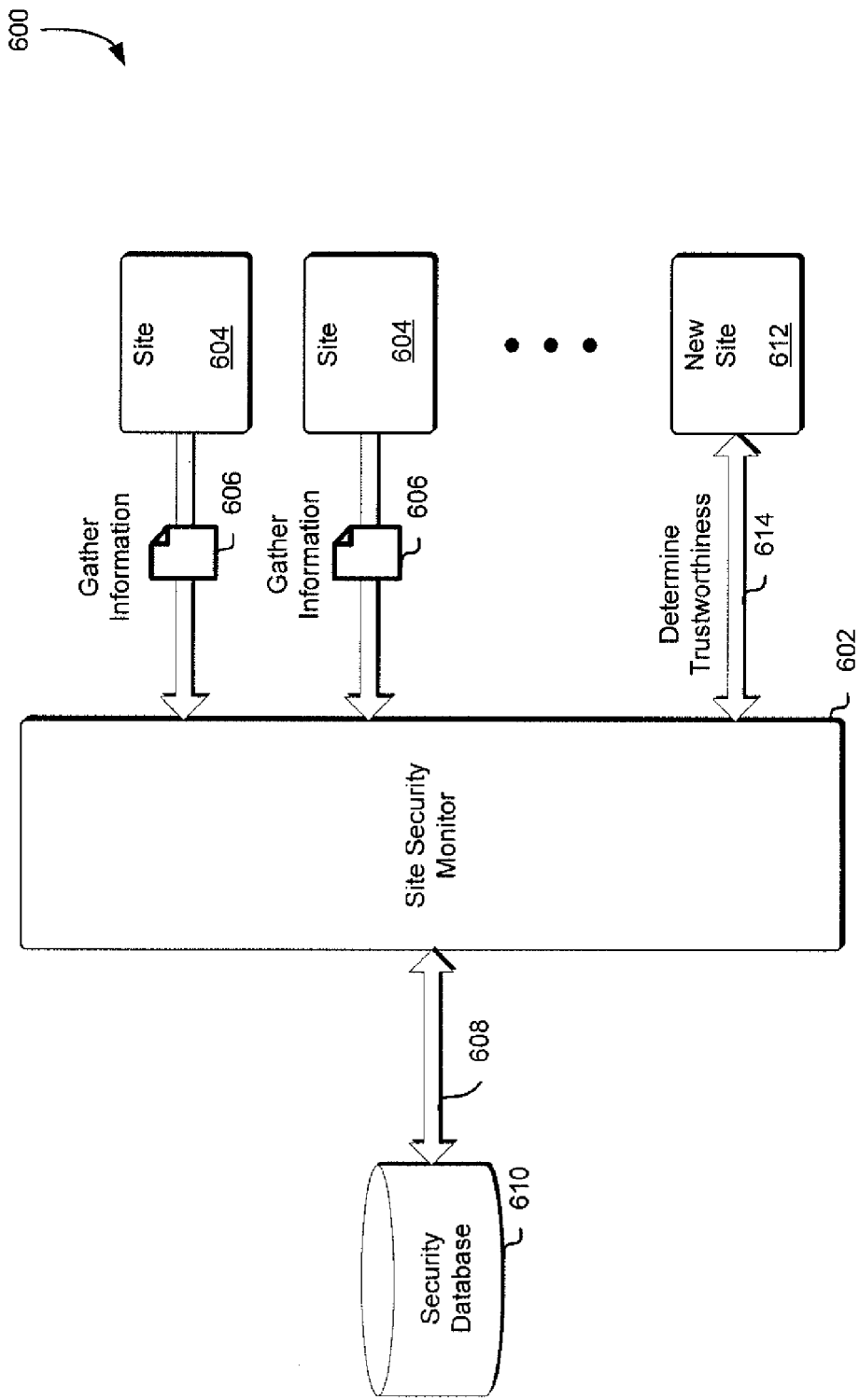
FIG. 6 illustrates an environment where sites may be analyzed based on previously performed scans in accordance with an embodiment.

FIG. 6 illustrates an environment 600 where a site may be analyzed based at least in part on previous scans of other sites as described herein in connection with FIG. 1. A site security monitor 602 may gather security information 606 from a plurality of sites 604 and may store 608 that security information in a security database 610 as described herein. The site security monitor 602 may then use this stored security information to determine a trustworthiness index 614 of a previously unknown, new site 612 without performing a detailed scan of that site. The new site 612 may be a third-party site and may not be configured to provide detailed scanning information. The site security monitor may also not be configured with access to obtain detailed scanning information, or may not have the resources to perform a detailed scan.

The analysis to determine a trustworthiness index 614 for a new site 612 without performing a detailed scan of the new site 612 may be performed by gathering one or more publicly available factors (also referred to herein as features) from the new site 612 and by comparing the values of those factors (or sets of those factors) to the values obtained for factors (or sets of factors) from more detailed scans of sites with known trustworthiness indices. Data from scans stored in the security database 610 may indicate that sites with high trustworthiness indices generally exhibit certain behavior as indicated by one or more factors with values in a certain range. For example, sites with high trustworthiness indices may tend to update their copyright notices within five days of the New Year, sites with medium trustworthiness indices may tend to update their copyright notices within 30 days of the New Year, and sites with low trustworthiness indices may tend to update their copyright notices after that. Using this information, a surface scan for the copyright notice may be used to determine an inference about the level of security of a new site 612 using this correlation between the update time of a copyright notice and the known trustworthiness index of a site. Factors and/or sets of factors may be used in correlation with one another to determine an inference about the level of security of a site. In an embodiment, a factor and/or a set of factors may have a minimal impact on the inference based on, for example, the presence of other factors and/or sets of factors.

Other factors may be used to update that inference and also to determine a confidence score associated with that inference. In the aforementioned example, a surface scan on the fifth day after the New Year that shows a site with an updated copyright notice may result in a highly confident inference that the site may have a high level of security based on the previously observed scans. That same surface scan that does not show an updated copyright notice on the tenth day may result in a moderately confident inference that the site has a low level of security, but with a low confidence that the site is has a low level of security. Other factors, such as the factors described herein in association with the surface scan operations 204 described in connection with FIG. 2, may be used to update the inferred level of security of a new site 612 and/or also to update a confidence score associated with that inferred level of security.

Figure 7:
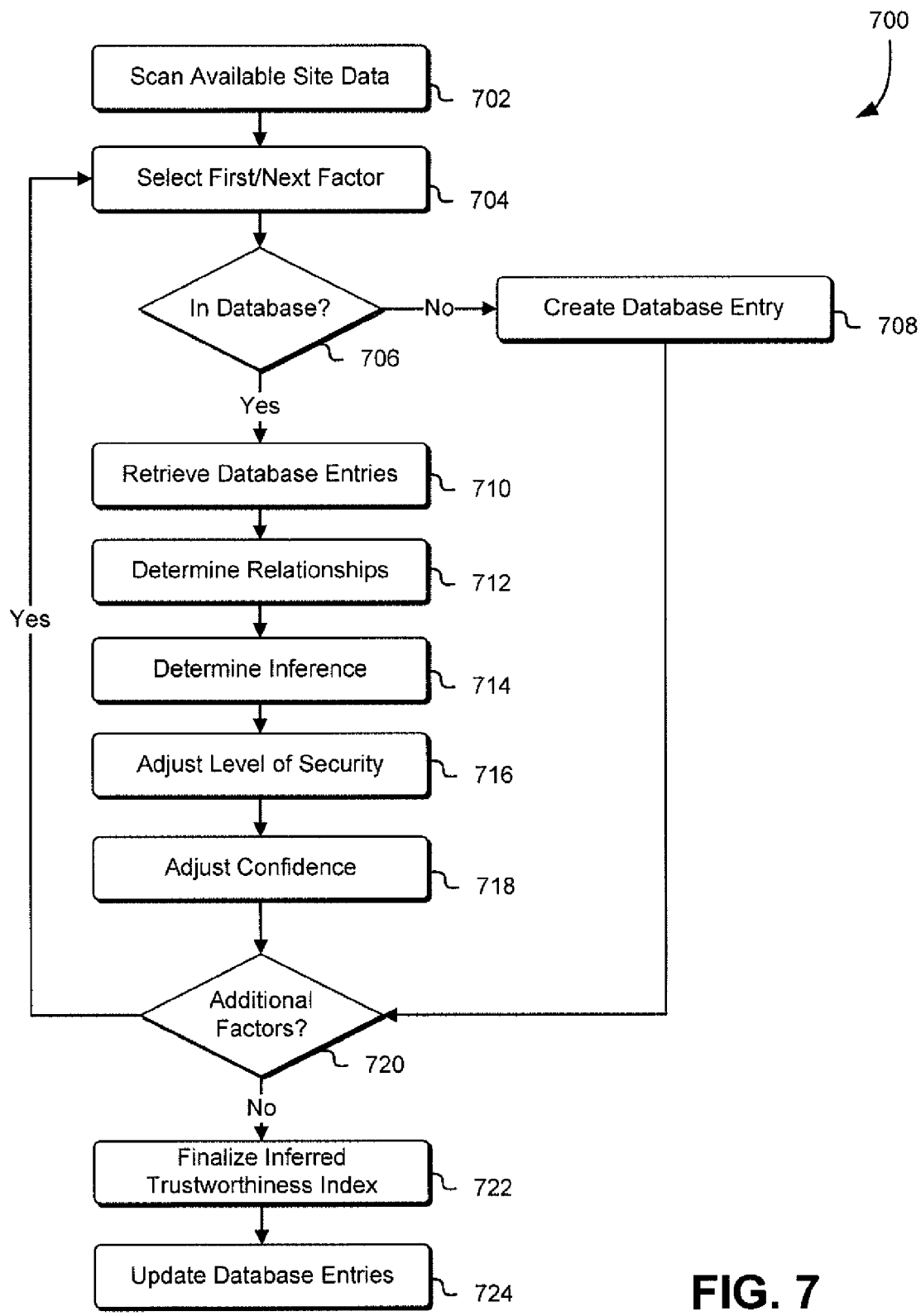
FIG. 7 illustrates a process for generating site security inferences for new sites in accordance with an embodiment.

FIG. 7 illustrates a process 700 for generating site security inferences for new sites as described herein in connection with FIG. 1. A site security monitor such as the site security monitor 102 illustrated in connection with FIG. 1 may perform the process illustrated in FIG. 7. The site security monitor may first scan available site data 702 for a new site and may select the first factor 704 obtained from that available site data. If the factor is not in the site security database 706, the site security monitor may create a new entry in the database associated with that previously unknown factor 708. The site security monitor may also ignore that previously unknown factor. The site security monitor may then determine whether there are any additional factors 720 to analyze.

In the event that the factor is present in the site security database 706, the site security monitor may retrieve database entries 710 associated with that factor, may determine one or more relationships 712 between values and parameters associated with that factor and known factors associated with other sites obtained from the database. The site security monitor may also determine an inference 714 about the level of security of the new site, based on the one or more relationships. The inference 714 about the level of security of the new site (also referred to herein as a "site security index") may also have an associated confidence score as described herein. The site security monitor may then adjust the inferred level of security 716 of the new site based on the created inference and may also adjust a confidence score 718 associated with that inferred level of security based on the one or more correlations. If there are any additional factors 720 to analyze, the site security monitor may select the next factor and continue with the process. When there are no more additional factors 720 to analyze, the site security monitor may finalize the inferred level of security for the new site, may adjust the confidence score for that inference, and may update one or more entries 724 in the security database.

Figure 8:
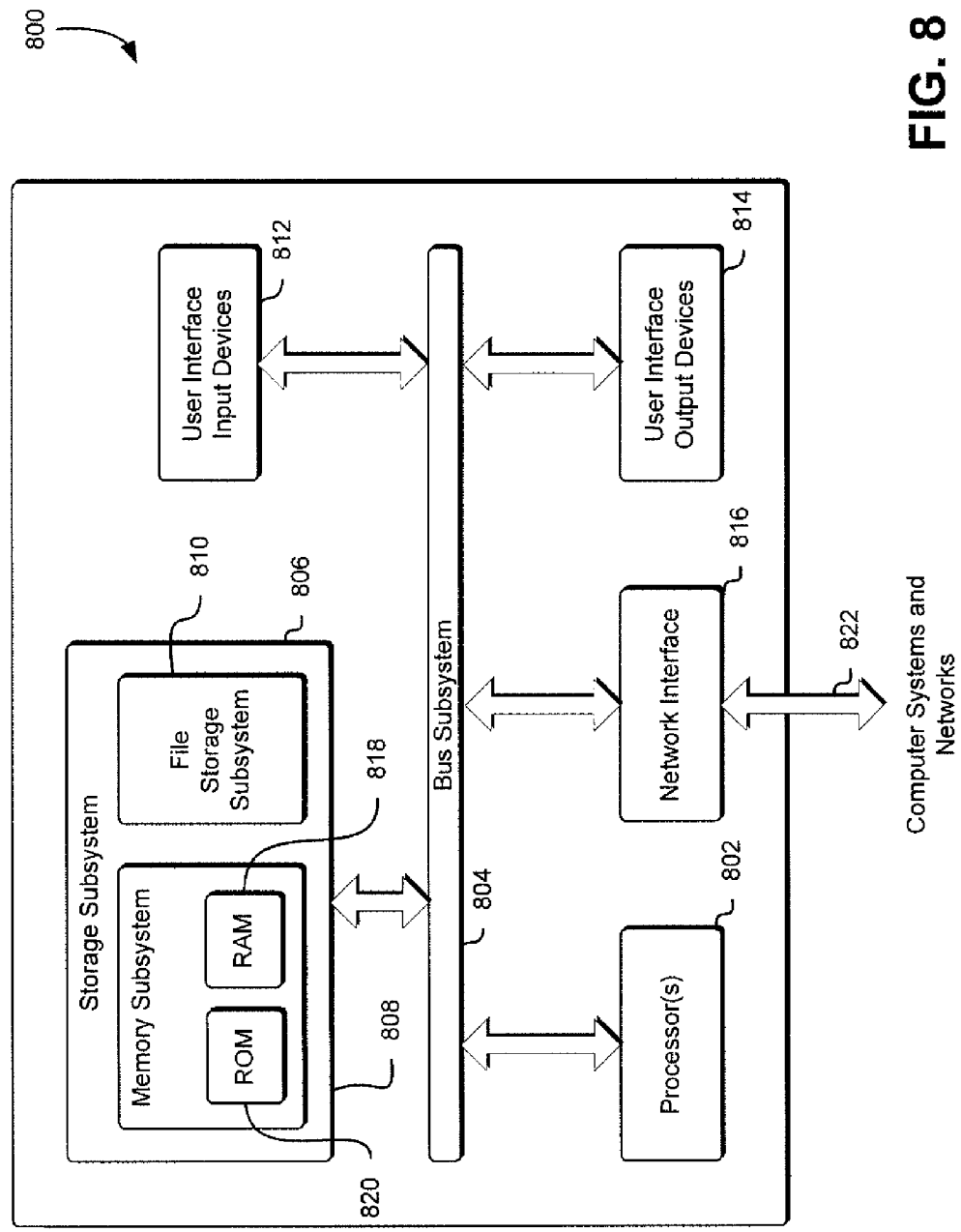
FIG. 8 illustrates an environment in which various embodiments can be implemented.

FIG. 8 is a simplified block diagram of a computer system 800 that may be used to practice embodiments of the present invention. In various embodiments, one or more instances of the computer system 800 may be used to implement any of the systems illustrated and described above. For example, one or more instances of the computer system 800 may be used to implement processes for scanning sites, for recording the results of those scans, or for generating inferences regarding new sites according to the present disclosure. As shown in FIG. 8, the computer system 800 may include one or more processors 802 that may be configured to communicate with and are operatively coupled to a number of peripheral subsystems via a bus subsystem 804. These peripheral subsystems may include a storage subsystem 806, comprising a memory subsystem 808 and a file storage subsystem 810, one or more user interface input devices 812, user interface output devices 814, and a network interface subsystem 816.

The bus subsystem 804 may provide a mechanism for enabling the various components and subsystems of computer system 800 to communicate with each other as intended. Although the bus subsystem 804 is shown schematically as a single bus, alternative embodiments of the bus subsystem may utilize multiple busses.

The network interface subsystem 816 may provide an interface 822 to other computer systems and networks. The network interface subsystem 816 may serve as an interface for receiving data from and transmitting data to other systems from the computer system 800. For example, the network interface subsystem 816 may enable a user computer system device to connect to the computer system 800 via the Internet and/or other network, such as a mobile network, and facilitate communications using the network(s) to access sites to be scanned and/or to provide the results of those scans.

The user interface input devices 812 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. Further, in some embodiments, input devices may include devices usable to obtain information from other devices. Input devices may include, for instance, magnetic or other card readers, one or more USB interfaces, near field communications (NFC) devices/interfaces and other devices/interfaces usable to obtain data (e.g., scan data) from other devices. In general, use of the term "input device" is intended to include all possible types of devices and mechanisms for inputting information to the computer system 800.

The user interface output devices 814 may include a display subsystem, a printer, or non-visual displays, such as audio and/or tactile output devices. Generally, the output devices 814 may invoke one or more of any of the five senses of a user. For example, the display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the computer system 800. The output devices 814 may be used, for example, to generate and/or present user interfaces to facilitate user interaction with applications performing processes described herein and variations therein, when such interaction may be appropriate. While a computer system 800 with user interface output devices is used for the purpose of illustration, it should be noted that the computer system 800 may operate without an output device, such as when the computer system 800 is operated in a server rack and, during typical operation, an output device is not needed.

The storage subsystem 806 may provide a computer-readable storage medium for storing the programming and data constructs that provide the functionality of the present invention. Software (programs, code modules, instructions) that, when executed by one or more processors 802, may provide the functionality of the present invention, may be stored in storage subsystem 806. The storage subsystem 806 may also provide a repository for storing data used in accordance with the present invention. The storage subsystem 806 may comprise memory subsystem 808 and disk or file storage subsystem 810. The storage subsystem may include database storage for security scan results, file storage and/or other storage functionality.

The memory subsystem 808 may include a number of memory devices including, for example, random access memory (RAM) 818 for storage of instructions and data during program execution and read-only memory (ROM) 820 in which fixed instructions may be stored. The file storage subsystem 810 may provide a non-transitory persistent (non-volatile) storage for program and data files, and may include a hard disk drive, a floppy disk drive along with associated removable media, a compact disk read-only memory (CD-ROM) drive, a digital versatile disk (DVD), an optical drive, removable media cartridges, and other like storage media.

The computer system 800 may be of various types including a personal computer, a portable computer, a workstation, a network computer, a mainframe, a kiosk, a server, or any other data processing system. Due to the ever-changing nature of computers and networks, the description of computer system 800 depicted in FIG. 8 is intended only as a specific example for purposes of illustrating the preferred embodiment of the computer system. Many other configurations having more or fewer components than the system depicted in FIG. 8 are possible.

The various embodiments further can be implemented in a wide variety of operating environments, which in some cases can include one or more user computers, computing devices or processing devices, which can be used to operate any of a number of applications. User or client devices may include any of a number of general-purpose personal computers, such as desktop, laptop or tablet computers running a standard operating system, as well as cellular, wireless and handheld devices running mobile software and capable of supporting a number of networking and messaging protocols. Such a system may also include a number of workstations running any of a variety of commercially available operating systems and other known applications for purposes such as development and database management. These devices may also include other electronic devices, such as dummy terminals, thin-clients, gaming systems and other devices capable of communicating via a network. These devices may also include virtual devices such as virtual machines, hypervisors and other virtual devices capable of communicating via a network.

Various embodiments of the present disclosure may utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server may run any of a variety of servers or mid-tier applications, including Hypertext Transfer Protocol ("HTTP") servers, Hypertext Transfer Protocol Secure ("HTTPS") servers, Transport Layer Security ("TLS") servers, SPDY™ servers, File Transfer Protocol ("FTP") servers, Common Gateway Interface ("CGI") servers, data servers, Java servers, Apache servers, Internet Information Services ("IIS") servers, Zeus servers, Nginx servers, lighttpd servers, proxy servers (e.g., F5®, Squid, etc.), business application servers, and other servers (e.g., Incapsula™, CloudFlare®, DOSarrest, Akamai®, etc.). The server(s) may also be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python®, JavaScript®, or TCL, as well as combinations thereof. The server(s) may also include database servers, including without limitation those commercially available from Oracle®, Microsoft®, Sybase®, and IBM® as well as open-source servers such as MySQL, NoSQL, Hadoop, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices may also include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory (referred to herein as a "non-transitory computer-readable storage medium") and/or may be tangible (referred to herein as a "tangible non-transitory computer-readable storage medium").

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for generating a trustworthiness index, comprising:
under the control of one or more computer systems configured with executable instructions,
determining a scan level of a first set of sites based on parameters associated with the first set of sites;
measuring one or more security factor values, each security factor value associated with a security factor of a set of security factors, the one or more security factor values measured based at least in part on a set of security scans of the first set of sites at the scan level, the set of security scans comprising a plurality of security scans, the set of security scans performed over a non-zero time span;
generating, for one or more sites of the first set of sites, a first set of security indices associated with one or more of the set of security factors, each security index of the first set of security indices based at least in part on the one or more security factor values;
calculating one or more normalized security indices associated with first set of security indices by at least:
a) retrieving, from a data store, a second set of security indices, each security index of the second set of security indices associated with a site of a second set of sites, the second set of sites at least including one or more sites differing from one or more of the first set of sites; and
b) normalizing one or more of the first set of security indices to produce the one or more normalized security indices based at least in part on one or more of the second set of security indices;

providing the one or more of the one or more normalized security indices to the data store; and providing, to the data store, a trustworthiness index associated with one or more associated sites of the first set of sites, the trustworthiness index based at least in part on combining one or more of the one or more normalized security indices, wherein the trustworthiness index determines a level of security of the one or more associated sites of the first set of sites.

2. The computer-implemented method of claim 1, wherein combining the one or more normalized security indices is based at least in part on a weighted combination of the one or more normalized security indices.

3. The computer-implemented method of claim 1, further comprising:

retrieving, from the data store, a set trustworthiness indices, each trustworthiness index of the set of trustworthiness indices associated with one or more sites of a third set of sites, the third set of sites at least including one or more sites differing from a customer site; and inferring a site security index associated the customer site based at least in part on one or more trustworthiness indices of the set of trustworthiness indices.

4. The computer-implemented method of claim 1, wherein the trustworthiness index is based at least in part on one or more service levels associated with the one or more associated sites.

5. A system, comprising:

at least one processor and at least one memory device configured to store executable instructions to implement one or more services, when the instructions are executed by the processor, the one or more services are configured to:

determine a scan level of a first site based on parameters associated with the first site;

scan the first site at the scan level, one or more times over a non-zero time span, for one or more first security values, each first security value associated with a security factor of a set of security factors;

retrieve one or more security indices from a data store for each first security value, the one or more security indices based at least in part on the security factor associated with the security value, each security index of the one or more security indices associated with a second site;

add a normalized security value for each first security value of the one or more first security values to a set of normalized security values, the normalized security value based at least in part on the one or more security indices;

calculate a trustworthiness index associated with the first site based at least in part on a combination of a subset of the set of normalized security values; and provide the trustworthiness index to the data store, wherein the trustworthiness index determines a level of security of the first site.

6. The computing system of claim 5, wherein the first site is a customer site.

7. The computing system of claim 5, wherein the one or more services configured to scan the site are further configured to perform a plurality of scans of the site over a non-zero time span, each scan of the plurality of scans configured to add a second security value from the site to a set of second security values.

8. The computing system of claim 7, wherein the normalized security value is based at least in part on a probability density function, the probability density function based at least in part on a subset of the set of second security values.

9. The computing system of claim 8, wherein the normalized security value is based at least in part on a survivorship function, the survivorship function based at least in part on the probability density function.

10. The computing system of claim 8, wherein the normalized security value is based at least in part on a cumulative distribution function, the cumulative distribution function based at least in part on the probability density function.

11. The computing system of claim 5, wherein the one or more services are further configured to:

receive, one or more trustworthiness indices associated with one or more sites, the one or more sites each having an associated set of security factors at least a subset of which are associated with the second site; and infer a site security index from the one or more trustworthiness indices based at least in part on one or more of the set of normalized security values.

12. The computing system of claim 11, wherein the one or more services are further configured to calculate a confidence score associated with the site security index, the confidence score based at least in part on the one or more trustworthiness indices.

13. A tangible non-transitory computer-readable storage medium having stored thereon executable instructions that, when executed by one or more processors of a computer system, cause the computer system to at least:

determine a scan level of a first site based on parameters associated with the first site;

measure a set of security factor values associated with the first site by performing a plurality of security scans at the scan level of the first site over a non-zero time span, each security factor value of the set of security factor values associated with a security factor of a set of security factors;

calculate a normalized security index associated with the security factor, the normalized security index based at least in part on a subset of the set of security factor values, the normalized security index further based at least in part on one or more security indices associated with one or more second sites, different from the first site, retrieved from a data store; and provide, to the data store, a trustworthiness index based at least in part on the normalized security index, wherein the trustworthiness index determines a level of security of the first site.

14. The tangible non-transitory computer-readable storage medium of claim 13, wherein the instructions further include instructions that, when executed by the one or more processors, cause the computer system to:

receive one or more trustworthiness indices, each trustworthiness index of the one or more trustworthiness indices associated with one or more third sites;

infer a site security index associated with a customer site, the customer site differing from one or more of the one or more third sites; and provide the site security index.

15. The tangible non-transitory computer-readable storage medium of claim 13, wherein the instructions further include instructions that, when executed by the one or more processors, cause the computer system to store the trustworthiness index in the data store.

16. The tangible non-transitory computer-readable storage medium of claim 13, wherein each scan of the plurality of scans has a scan configuration, the scan configuration specifying performance of one or more of: a surface scan, a detailed scan, a login scan, or a forms scan.

17. The tangible non-transitory computer-readable storage medium of claim 16, wherein the scan configuration is based at least in part on a service level associated with the first site.

18. The tangible non-transitory computer-readable storage medium of claim 13, wherein the set of security factors include one or more authentication attributes.

19. The tangible non-transitory computer-readable storage medium of claim 13, wherein the instructions that cause the computer system to calculate the normalized security index further include instructions that, when executed by the one or more processors, cause the computer system to multiply one or more security factor values in the subset of the set of security factor values by one or more weighting factors, the one or more weighting factors determined based at least in part on one or more security objectives.

20. The tangible non-transitory computer-readable storage medium of claim 19, wherein the one or more weighting factors are configured to reward fixing one or more security vulnerabilities.

* * * * *